US008629770B2

(12) United States Patent
Hummer et al.

(10) Patent No.: US 8,629,770 B2
(45) Date of Patent: *Jan. 14, 2014

(54) SENSOR FOR CONTAINER MONITORING SYSTEM

(76) Inventors: Gregory J. Hummer, Shaker Heights, OH (US); Chung-Chiun Liu, Cleveland Heights, OH (US)

( * ) Notice: Subject to any disclaimer, the term of this patent is extended or adjusted under 35 U.S.C. 154(b) by 325 days.

This patent is subject to a terminal disclaimer.

(21) Appl. No.: 13/031,311

(22) Filed: Feb. 21, 2011

(65) Prior Publication Data

US 2011/0140885 A1 Jun. 16, 2011

Related U.S. Application Data

(63) Continuation-in-part of application No. 12/707,062, filed on Feb. 17, 2010, now Pat. No. 7,911,336, and a continuation-in-part of application No. 11/705,142, filed on Feb. 9, 2007, now Pat. No. 7,667,593, which is a continuation-in-part of application No. 10/998,324, filed on Nov. 29, 2004, now Pat. No. 7,176,793.

(60) Provisional application No. 61/321,257, filed on Apr. 6, 2010, provisional application No. 61/385,340, filed on Sep. 22, 2010.

(51) Int. Cl.
*G08B 1/08* (2006.01)
*G01N 7/00* (2006.01)

(52) U.S. Cl.
USPC .............. 340/539.13; 340/539.1; 340/539.26; 340/531; 340/540; 73/23.2

(58) Field of Classification Search
USPC ............. 340/539.13, 539.1, 539.26, 531, 540
See application file for complete search history.

(56) References Cited

U.S. PATENT DOCUMENTS

| | | | | |
|---|---|---|---|---|
| 5,008,661 | A * | 4/1991 | Raj | 340/10.51 |
| 6,803,840 | B2 * | 10/2004 | Kowalcyk et al. | 333/186 |
| 6,997,039 | B2 | 2/2006 | Rao et al. | |
| 7,005,982 | B1 | 2/2006 | Frank | |
| 7,019,640 | B2 * | 3/2006 | Canich et al. | 340/531 |
| 7,109,859 | B2 | 9/2006 | Peeters | |
| 7,112,816 | B2 | 9/2006 | Schlaf et al. | |
| 7,151,447 | B1 | 12/2006 | Willms et al. | |
| 7,176,793 | B1 | 2/2007 | Hummer | |
| 7,292,828 | B1 | 11/2007 | Liu et al. | |

(Continued)

FOREIGN PATENT DOCUMENTS

WO WO 2006/127884 11/2006

OTHER PUBLICATIONS

Barry, et al., "Printing nanoparticles from the liquid and gas phases using nanoxerography," Nanotechnology 14 (2003) 1057-1063.
U.S. Appl. No. 13/029,399, filed Feb. 17, 2011, Hummer.

(Continued)

*Primary Examiner* — Donnie Crosland
(74) *Attorney, Agent, or Firm* — Fay Sharpe LLP

(57) ABSTRACT

A detection system for an enclosed container for an enclosed cargo container includes a sensor device for sensing a material harmful to human beings within an enclosed cargo container and a detection device coupled to the sensor device for transmitting a corresponding signal to a monitoring device outside the cargo container. Containers which have harmful materials within them can be inspected or stopped before entering the country.

22 Claims, 17 Drawing Sheets

(56) References Cited

U.S. PATENT DOCUMENTS

| | | | | |
|---|---|---|---|---|
| 7,525,431 | B2 * | 4/2009 | Britton, Jr. et al. | 340/572.1 |
| 7,638,252 | B2 | 12/2009 | Stasiak et al. | |
| 7,667,593 | B1 * | 2/2010 | Hummer | 340/539.13 |
| 7,911,336 | B1 * | 3/2011 | Hummer | 340/539.13 |
| 2004/0119591 | A1 | 6/2004 | Peeters | |
| 2005/0057344 | A1 * | 3/2005 | Davis et al. | 340/425.5 |
| 2005/0236478 | A1 | 10/2005 | St. Clair et al. | |
| 2007/0115474 | A1 | 5/2007 | Chaton et al. | |
| 2007/0127164 | A1 | 6/2007 | Ofek et al. | |
| 2007/0138583 | A1 | 6/2007 | Ofek et al. | |
| 2008/0314149 | A1 | 12/2008 | Rueger | |
| 2009/0131274 | A1 | 5/2009 | Pison et al. | |
| 2009/0173931 | A1 | 7/2009 | Stumbo | |
| 2009/0309676 | A1 | 12/2009 | Zettl et al. | |
| 2010/0008825 | A1 | 1/2010 | Subramanyam | |

OTHER PUBLICATIONS

Penza, et al. "Carbon nanotubes-based surface acoustic waves oscillating sensor for vapour detection", Thin Solid Films, vol. 472, Issues 1-2, Jan. 24, 2005, pp. 246-252.

Buck, R. "Bioanalytic Sensors" The Biomedical Engineering Handbook: Second Edition, 2000, pp. 1-10.

Stetter, et al. "Senors: Engineering Structures and Materials from Micro to Nano", The Electrochemical Society Interface. Spring 2006, pp. 66-69.

* cited by examiner

SENSOR FOR CONTAINER MONITORING SYSTEM

This application claims the priority, as a continuation-in-part, of application Ser. No. 12/707,062, filed on Feb. 17, 2010 (now U.S. Pat. No. 7,911,336, issued on Mar. 22, 2011), and claims the priority, as a continuation-in-part, of application Ser. No. 11/705,142, filed on Feb. 9, 2007 (now U.S. Pat. No. 7,667,593, issued on Feb. 23, 2010), from which the 12/707,062 application claims priority, and claims the priority, as a continuation-in-part, of application Ser. No. 10/998,324, filed on Nov. 29, 2004 (now U.S. Pat. No. 7,176,793), from which the 11/705,142 application claims priority. This application also claims the benefit of Application Ser. No. 61/321,257, filed on Apr. 6, 2010, and of Application Ser. No. 61/385,340, filed on Sep. 22, 2010. The disclosures of all of these applications are incorporated herein by reference in their entireties.

BACKGROUND

The present exemplary embodiment relates to the detection arts. It finds particular application in conjunction with cargo containers which are used to ship products, foodstuffs, and other materials from one country to another, and will be described with particular reference thereto. However, it is to be appreciated that the present exemplary embodiment is also amenable to other like applications.

Cargo containers are widely used for shipping materials by land or by water from one country to another. Knowing the contents of such containers has become of increasing importance in detecting potential threats. It has thus become extremely important to monitor the contents of such containers for harmful materials, such as explosives, harmful biological and chemical materials, and radiation materials.

U.S. Pat. No. 7,176,793 discloses a detection device in the form of a strip for use in an enclosed container. The detection strip includes sensors of macro, meso or nanosize, all of which are referred to as nanosensors, for detecting materials that are harmful to human beings within an enclosed container and for transmitting a corresponding resonance frequency. One or more detection strips are initially placed within a container, depending on the size of the container. The detection devices are designed to send off specific resonant frequency signals which can be detected by voltage changes and/or current changes which are correlated to any harmful material detected within the container. A serial number computer chip is provided for specifically identifying the detection device and transmitting a corresponding resonance frequency, which allows the container to be identified. A power source is provided for operating the detection strip. A hand-held or stationary monitor is provided for monitoring the container for any signals given off from the detection strips within the container. The detection devices are designed to give off a predetermined amount of background signal. In consequence, if no such signals are received, the container is highly suspect as being tampered with, allowing such a container to be quickly removed and its contents examined.

For some applications, hazardous materials may be at relatively low concentrations, for example hazardous nuclear materials may be distributed in amongst other materials or chemical or biological warfare agents may be in small concentrations within the container.

The exemplary embodiment provides a solution to this problem by mounting a sensor to one or more interior walls of the container which provides a unique fingerprint for a hazardous material. The signals output by the sensor can be received by one or more detection devices which communicate the signals to an exterior monitor.

BRIEF DESCRIPTION

In accordance with one aspect of the exemplary embodiment, a detection system for an enclosed container includes a sensor device comprising carbon nanoparticles for detecting materials harmful to human beings, such as explosives, e.g., nitro-containing explosives such as trinitrotoluene (TNT) and/or peroxide-based explosives, within an enclosed container and transmitting a corresponding detection signal and at least one detection device which detects the detection signal and outputs a signal responsive thereto.

In another aspect, in combination, a cargo container in which any suitable cargo is placed for transport from one place to another place, a detection system disposed in the container for detecting tampering with the container, the detection system including a sensor device, means of storing and transmitting information acquired by the sensor, and a power source for operating the detection system.

DETAILED DESCRIPTION

Aspects of the exemplary embodiment relate to a sensing system suitable for detection of trinitrotoluene and other harmful species at low concentrations in a shipping container.

Figure 1:
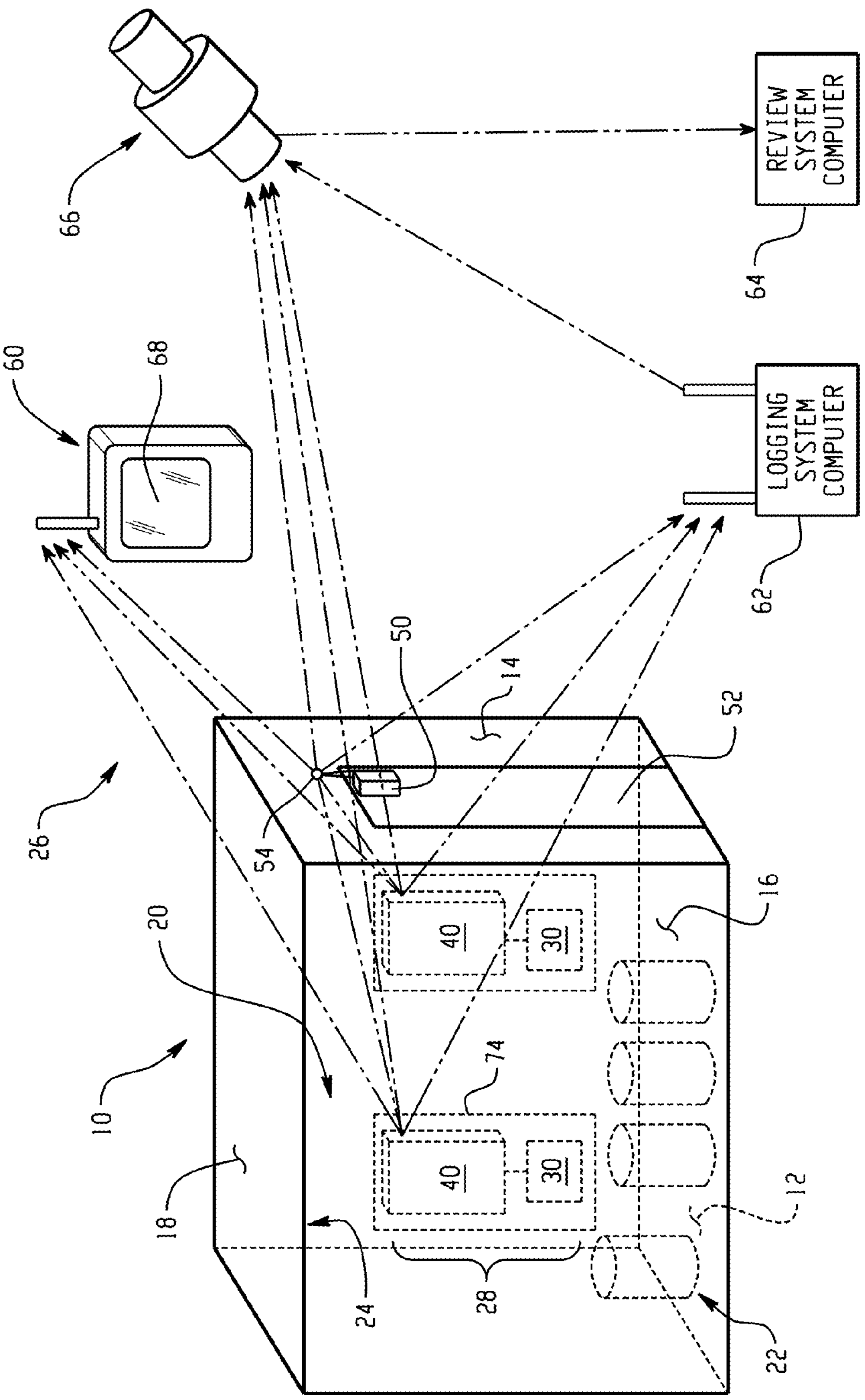
FIG. 1 is a perspective view of a shipping container and a container monitoring system in accordance with one aspect of the exemplary embodiment.

With reference to FIG. 1, there is shown a container 10 which can be of any size, including large cargo containers. Cargo containers 10 are generally made of metal and include eight walls, namely, a bottom 12 with a pair of opposing, upstanding similar sides 14, a pair of similar opposing ends 16, and a top 18, for covering and closing the cargo container 10. The walls 12, 14, 16, 18 may be made of metal, such as steel or alumina, or from non-metallic material, such as carbon fiber, or a combination thereof. The walls 12, 14, 16, 18 define an interior space 20 for receiving a cargo 22, such as a liquid, solid, or other material. Each wall 12, 14, 16, 18 has an interior surface 24, some or all of which may be in contact with the cargo 22.

A container monitoring system 26 includes one or more detection systems 28, for monitoring conditions within the container 10. Each detection system 28 includes one or more sensor devices 30 carried within the container, e.g., on the interior surfaces 24 of the walls. The sensor device(s) 30 may detect harmful materials, such as explosives, radioactive materials, harmful chemicals, such as chemical warfare agents, nerve gases, biological materials, such as such as gases, anthrax and other germ warfare agents, narcotics and other illegal drugs, or combinations thereof. At least one of the sensor devices 30 is configured for generating a signal which is indicative of the presence of a nitrogen-based explosive, such as trinitrotoluene (TNT) and/or a peroxide based explosive, such as triacetone triperoxide (TATP) or hexamethylenetriperoxidediamine (HMTD), or a combination thereof.

The detection system 28 also includes a detection device 40 in communication with the sensor device(s) 30. The exemplary detection device 40 is positioned within the container 10 and receives signals from the sensor device 30 and may also apply a voltage to the sensor device 30, such an alternating square wave voltage. In the exemplary embodiment, the detection device(s) is/are fixed to an interior surface 24 of a container wall. The exemplary detection devices 40 are capable of withstanding extremes of temperatures, humidity, vibrations, and salt air. Signals, such as current voltage changes, are carried, e.g., by appropriate wiring, from the sensor device 30 to the detection device 40. The detection device 40 may be configured, for example, as illustrated in U.S. Pat. No. 7,292,828 and/or as described in copending application Ser. No. 61/321,257, filed Apr. 6, 2010. For example, the detection device includes a power source 42, a current monitor 44, and a local data adapter/collector (LDA) 46 capable of multiplexing data which collects signals from the current monitor 44. A transmitter 48, incorporated in or separate from the LDA is capable of data transmission by satellite uplink and/or by direct line of sight up to 15-30 miles. U.S. Pat. No. 7,292,828, the disclosure of which is incorporated herein by reference, discloses one multichannel transmitter which employs wireless telemetry to send signals indicative of harmful materials to a remote receiver that may be used herein. In other embodiments, encrypted RF data signals are sent from the transmitter 48 to a transponder 50 (FIG. 1) which transmits the signals to a remote or local data transmission device. In a container with multiple detection devices 40, each one may have its own LDA/transmitter which communicates with transponder 50.

Transponder 50 may be exterior or interior of the container 10. In one embodiment, the transponder 50 (e.g., conforming to an RF protocol like Dash-7, ISO 18,000-7) may be mounted to a door 52 of the container 10, as illustrated in FIG. 1, to transmit signals from the detection devices 40 to a location outside the container. In one embodiment, transponder 50 may be mounted to an inside of the door 52, i.e., within the container interior 20, with an antenna 54 for the transponder being located on the outside of the door. The outside antenna 54 may include an indicator system to provide a visual or aural indication of the status of the container 10. For example, an orange light may be illuminated if the detection system 28 is not working properly and a red light may be illuminated if the detection system 28 has a sensor hit. The antenna 54 may communicate using IS018,000-7 protocol (Dash-7) or other RF protocol to a ship controller. A commercially available tamper-proof container door latch including a transponder 50 with an antenna 54 that uses Dash-7 sensing of temperature, humidity, shock and entry may be used as the transponder 50, with suitable modifications to enable transmission of data, which may be encrypted, from the detection system 28. Exemplary transponder devices of this type are sold under the tradename SAVI® (e.g., SAVI®ST-675) by Lockheed Martin Co.

In one embodiment, transmitter 48 or transponder 50 transmits the signals to a portable receiver 60 and/or to a local or remote data transmission, logging, and/or data analysis device 62, 64 (e.g., via a satellite link 66). In a container with multiple detection devices, each one may have its own detection device which communicates with transponder 50 (FIG. 1). The detection system may, for example, send a warning that the container 10 has been tampered with to the monitoring device 60, 62, 64 when a threshold level of the harmful substance is detected. The threshold may be, in some cases, the lowest level detectable by the sensor device, or one which is a predetermined amount above a normal background level.

The detection system 28 may include a global positioning system (GPS) computer chip 70 for providing a signal representative of the location of the detection system 28 and its associated container 10. For containers 10 which are below deck and/or covered by many other containers, the GPS chip 70 may receive a signal from a corresponding GPS chip in a local container if the satellite signal is too weak to be picked up.

The detection system 28 may include an encrypted serial numbered (ESN) computer chip 72 may also be embedded in or otherwise supported by the strip 54. The ESN chip 72 generates a signal corresponding to the device's unique serial number which may also be transmitted via the LDA/transmitter 46, 48. The components 42, 44, 46 48, 70, 72, of the detection device 40 may all be mounted on a common strip 74 formed form plastic or the like and components 44, 46 48, 70, 72, may all be powered by a single power source 42 or by separate power sources, such as a battery. For example, a low voltage motion activated power source 40 is carried by the strip 74. The power source 42 may be disconnected from the components by a magnetic switch 76 which completes the circuit with the components 44, 46 48, 70, 72 only intermittently. The container 10, when moved, may activate the power source 42 to maintain operation of the detection device 40. In this way, the power source is not drained two quickly. A battery thus may last for about two years before it needs to be replaced.

The power source 42 may be configured for applying a square wave voltage to the sensor device 30, e.g., alternating between positive and negative potentials (vs. reference) with a wavelength of about 1-10 minutes. The exemplary sensor device 30 is a three-electrode system including a counter electrode 82, a working electrode 84, and a reference electrode 86, which are exposed to the gaseous environment in the container in a detection region 88 of the sensor device 30. The square wave source 42 is connected to the working and reference electrodes 84, 86. The current monitor 44 is connected to the working and counter electrodes 84, 82.

Figure 4:
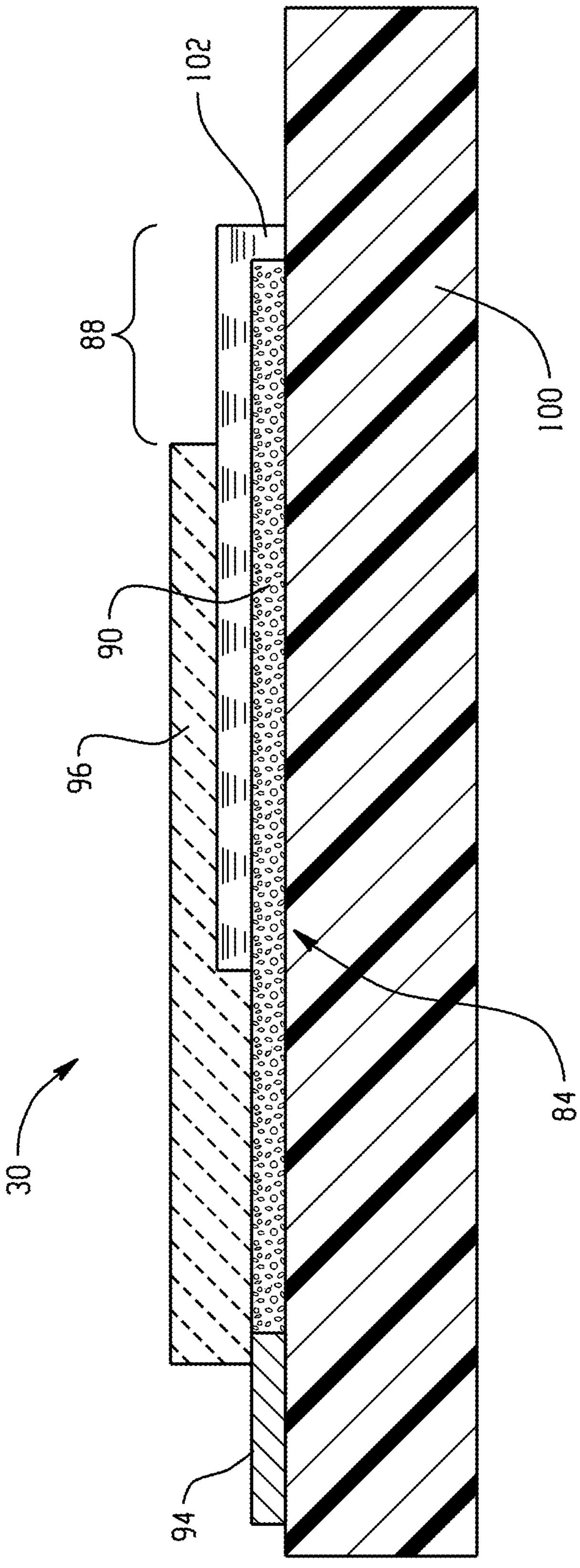
FIG. 4 is a side sectional view of the sensor device of FIG. 2.

As illustrated in FIG. 4, the exemplary working and counter electrodes 84, 82 include a layer 90 of particles, e.g., micro-, meso- or nano-sized particles of active carbon (porous carbon), which may be in the form of nanotubes. The active carbon nanoparticles may be combined with iridium particles, although in one embodiment, iridium particles are not used. The reference electrode may be a silver/silver chloride (Ag/AgCl) electrode. A respective silver contact pad 94 is connected with each of the electrodes. An insulation layer 96 may cover part of the electrodes, leaving tips of the electrodes exposed to the detection environment in region 88.

Figure 2:
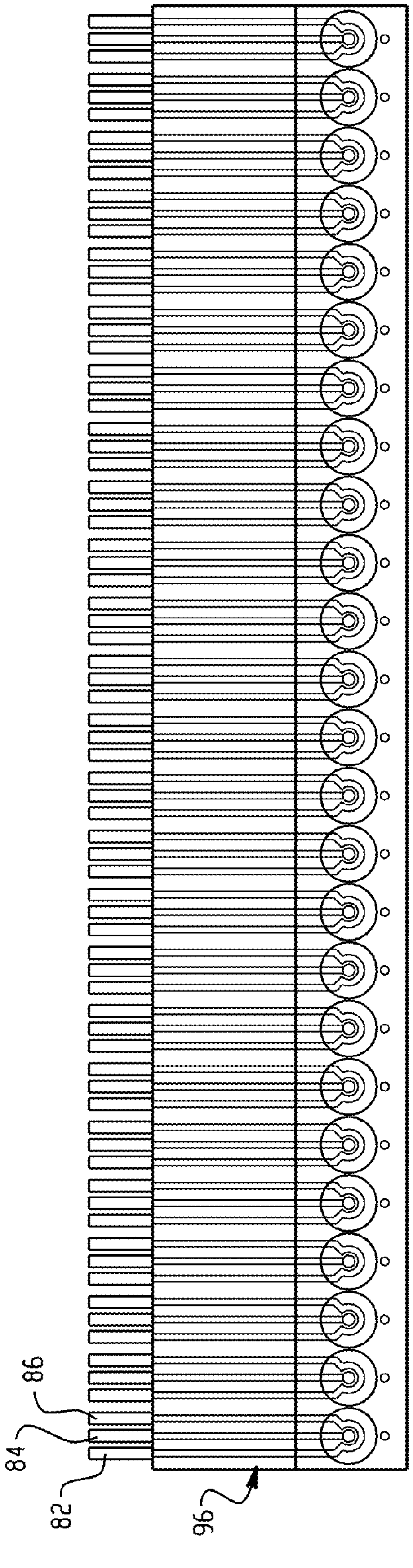
FIG. 2 is a top plan view of an array of sensor devices in a row manufactured by a screen-printing process.
Figure 3:
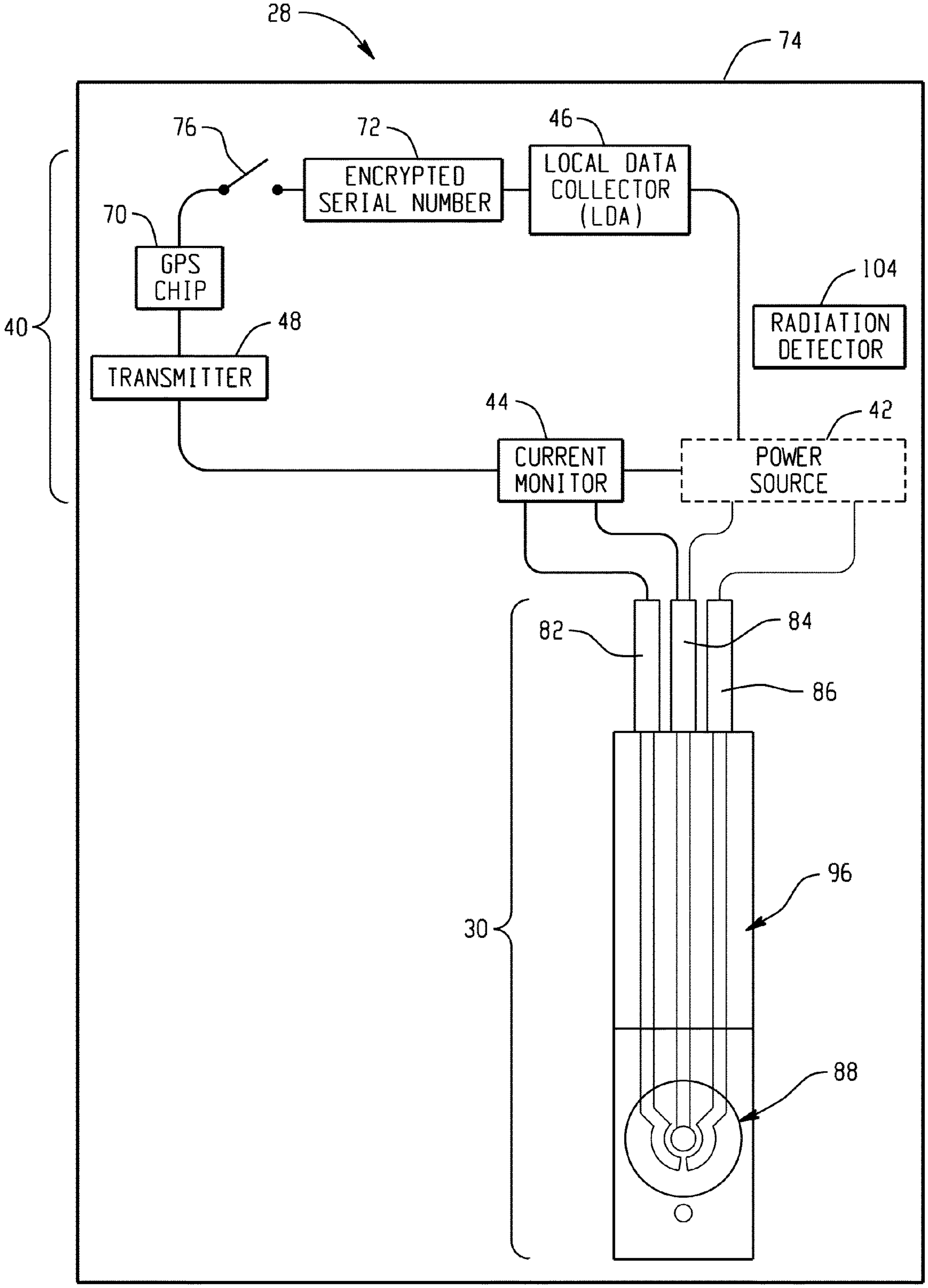
FIG. 3 is a functional block diagram which illustrates a sensing system comprising an individual sensor device of the type illustrated in FIG. 2.

The sensor devices 30 shown in FIGS. 3 and 4 can fabricated on a substrate 100 formed from polyester or other electrically non-conductive material, such as other polymeric materials, alumina ($Al_2O_3$), ceramic based materials, glass or a semi-conductive substrate, such as silicon, silicon oxide and other covered substrates. Multiple sensor devices 30 can thus be formed on a common substrate (FIG. 2). As will be appreciated, variations in the geometry and size of the electrodes are contemplated. The sensor device can operate in various electrochemical modes, including cyclic voltammetry, time-dependent current measurement, and square-wave voltammetry, or the like. Of these electrochemical measurement techniques, square wave voltammetry (SWV) allows a shorter detection time.

The sensor device 30 may be fabricated by cost-effective thick film screen and/or ink-jet printing processes. For example, in the case of the carbon electrodes, active carbon is mixed with a binder, deposited like an ink on the substrate, and allowed to dry.

The sensor device 30 can be used in an environment in which a conductive electrolyte exists, such as in sea water. The sensor device 30 also can be integrated with a conductive electrolyte layer, such as an ionic liquid or polymeric electrolyte 102. In this embodiment, the sensor device 30 may include electrodes 82, 84, 86 and an electrolyte layer 102, all laid down on a suitable substrate 100, as shown in the cross sectional view in FIG. 4. This provides a complete electrochemical sensing system which can be used and deployed in an environment where a conductive electrolyte is not available. The electrolyte 102 may be in the form of a gel which includes ionic liquid in a binder, optionally with a solvent. A suitable ionic liquid is a salt which is a liquid at ambient temperatures. Exemplary ionic liquids have a melting point below 100° C., generally below 50° C. Exemplary cations in the salt include alkyl imidazolium groups and alkyl and aryl pyridinium groups. Examples of ionic liquids include 1-butyl-3-methylimidazolium hexafluorophosphate, 1-hexyl-3-methylimidazolium hexafluorophosphate, 1-octyl-3-methylimidazolium hexafluorophosphate, 1-decyl-3-methylimidazolium hexafluorophosphate, 1-dodecyl-3-methylimidazolium hexafluorophosphate, 1-ethyl-3-methylimidazolium bis(trifluoromethylsulphonyl)amide, 1-hexyl-3-methylimidazolium bis(trifluoromethylsulphonyl)amide, 1-hexylpyridinium tetrafluoroborate, 1-octylpyridinium tetrafluoroborate, 1-butyl-3-methylimidazolium tetrafluoroborate, 1-methyl-3-ethyl imidazolium chloride, 1-ethyl-3-butyl imidazolium chloride, 1-methyl-3-butyl imidazolium chloride, 1-methyl-3-butyl imidazolium bromide, ethyl pyridinium bromide, ethyl pyridinium chloride, ethylene pyridinium dibromide, ethylene pyridinium dichloride, butyl pyridinium chloride, and benzyl pyridinium bromide. As an example, the ionic liquid 1-butyl-3-methylimidazolium hexafluorophosphate can be used as an electrolyte for detection of TNT.

The ionic liquid in layer 102 has desirable properties for use as an electrolyte including good stability at high temperature, relatively insensitive to moisture or humidity effects, and good ionic conductivity at ambient or low temperature. The exemplary ionic liquid is in a gel form covering the surface areas of working electrode 84. The ionic liquid may be hydrophilic such that it does not dry out when placed in a shipping container for an extended period. It should also be stable over a wide range of temperatures, such as up to 50° C. or higher.

A mixture of the ionic liquid, one or more of a gelling agent and a binder may be used to form the layer 102. A binder of polyvinylpyrrolidone (PVP), a resin, such as polyvinyl butyral (PVB) and a thermoplastic fluoropolymer, such as polyvinyldifluoride (PVDF) is used in the exemplary embodiment. A solvent may also be used which allows the mixture to be applied as an "ink" after which the solvent is evaporated. The solvent used to prepare this binder ink can be, for example, N-methylpyrrolidone (NMP). The solvent can be present at, for example, from 10-99 weight % of the ink, e.g., at about 90 wt. %. A ratio of binder to ionic liquid in the mixture can be, for example, from 1:0 to 1:1, e.g., about 3:10. The mixture is applied over the exposed working electrode 84. The deposition of the ionic liquid film can also be accomplished by spin-coating, ink-jet printing, and other dispensing techniques.

Harmful species, such as TNT, are transported through the ionic liquid to the sensor surface and cause a change in the signal transmitted by the sensor device 30.

As will be appreciated, a range of the binder to ionic liquid ratio can be used depending on the environmental conditions where the sensor device will be applied. Also, different ionic liquids and binder materials can be selected and used depending on the suitability of the applications of the sensor device.

Based on studies with related nitrotoluene compounds, the exemplary sensor device should readily detects TNT and other hazardous nitro-compounds in air or water at concentrations of as low as 1 ppm, and, with more sensitive current detector 44, could detect nitro compounds in the ppb range. The detection system 28 provides a unique fingerprint for aromatic nitro compounds, allowing non-harmful gases such as nitrogen oxides and ammonia to be easily eliminated from the detection scheme. The detection device can thus compare a current profile received from the sensor in response to an applied voltage with that of a known harmful substance to determine if there is a match and outputs a signal based thereon.

For detection of radiation generating materials, in addition to or as an alternative to the nanosensors, a radiation detection system 104 (FIG. 4) comprising one or more conventional scintillation counters may be employed to detect neutrons and high energy gamma rays or their reaction bi-products. The radiation detection system 104 may be linked to the detection device 40 to provide counts corresponding to detected radiation. In the embodiment shown in FIG. 4, the radiation detection system 104 is mounted to the same adhesive-backed strip 74, which carries the detection device 40 and optionally the sensor device 30. For example, radiation detection system 104 may include plastic scintillators which can very easily be shaped and machined to the forms desired in detectors (cylinders, rods, flat sheets, fibers, microspheres and thin films). Scintillators coupled to a photomultiplier tube detect ionizing radiation, such as the photons produced when high energy gamma rays emitted by the radiation generating materials interact with solid materials, or neutrons. Solid materials, such as those with high stopping power, may be placed intermediate the container interior and the scintillators of the radiation detection system 104 to absorb gamma rays and generate the detectable photons. As the solid material, $LaBr_3$ (Ce), for example, offers a higher stopping power for gamma rays (density of 5.08 $g/cm^3$ versus 3.67 $g/cm^3$ for NaI(TI)). LYSO ($Lu_{1.8}Y_{0.2}SiO_5$(Ce)) has an even higher density (7.1 g/cm$^3$), is non-hygroscopic, and has a high light output (32 photons/keV γ), in addition to being rather fast (41 ns decay time).

Gamma radiation may also be detected through its ability to dissociate atmospheric nitrogen and oxygen, resulting in the formation of nitrogen dioxide, which in turn serves as an ozone catalyst and thus can be detected through reductions in ozone levels. Other detection methods include the use of photodissociative bacteria or algae which respond to the photons generated, as well as topaz/silica, which turns from clear to blue in the presence of some forms of radiation.

Without intending to limit the scope of the exemplary embodiment, the following examples demonstrate the sensitivity of the exemplary detection system 28.

EXAMPLES

Example 1

Evaluation in Liquid Electrolyte

A screen-printed active carbon sensor device 30 with an active carbon working electrode 84, an active carbon counter electrode 82, and an Ag/AgCl reference electrode 86 was prepared. In the following examples, the carbon was not in extremely finely divided form, e.g., in the form of nanotubes, which is expected to yield improved results and lower (more sensitive) detection levels.

The detection of dinitrotoluene (DNT) isomers indicates the feasibility of detection of TNT, and other related explosive substances. In the following examples, three DNT species are used for the demonstration of the validity of the developed detection system 28. The three DNT species are 3,4-dinitrotoluene, 2,6-dinitrotoluene, and 2,4-dinitrotoluene. The sensor device 30 is suited to the detection of nitro-based explosives using electrochemical techniques.

Figure 5:
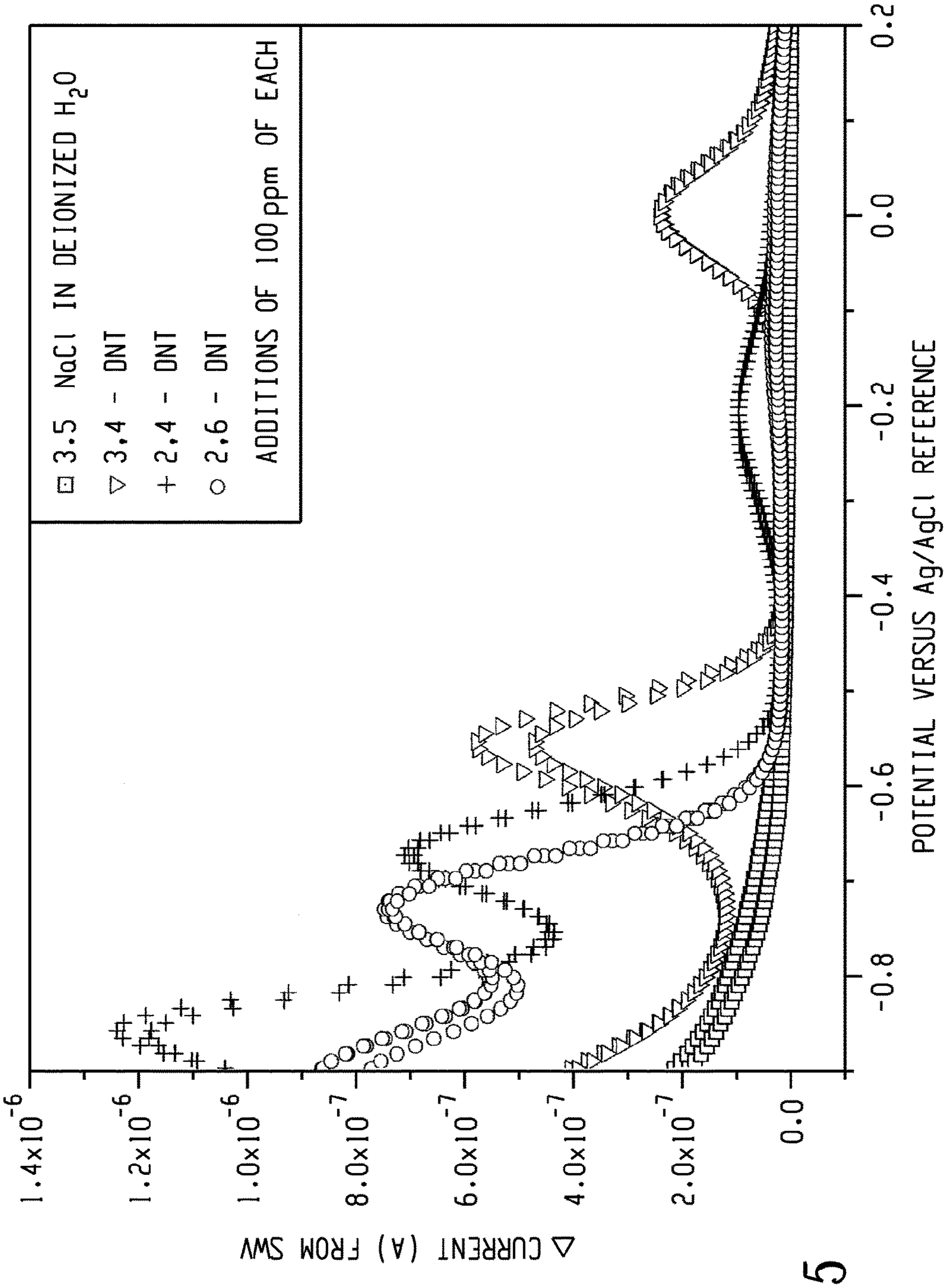
FIG. 5 illustrates sensor device performance for three individual dinitrotoluenes (DNTs) in a 3.5 wt % NaCl solution.
Figure 6:
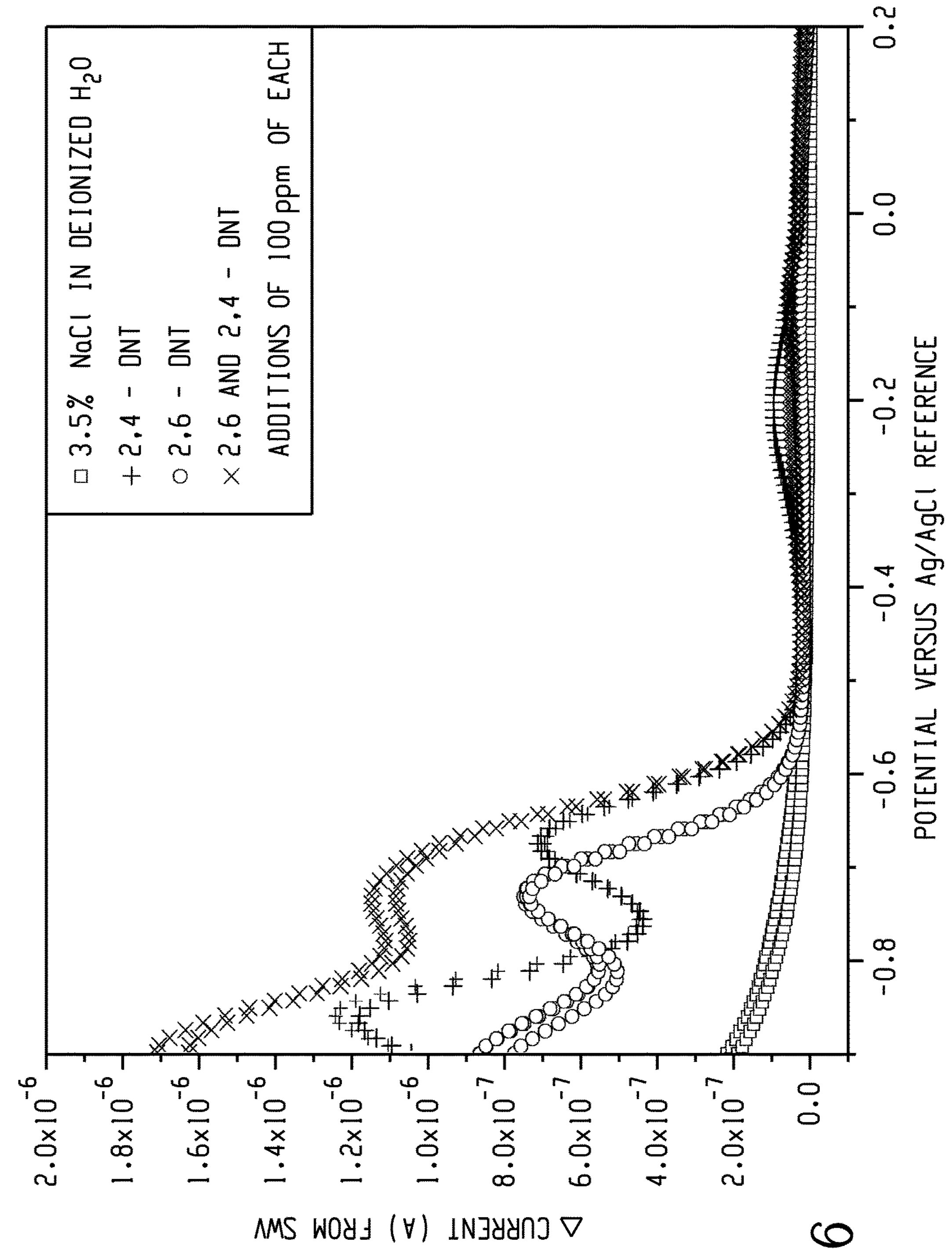
FIGS. 6-9 illustrate sensor device performances in mixed DNT species solutions (3.5 wt % NaCl) as compared to those for individual DNT species.
Figure 7:
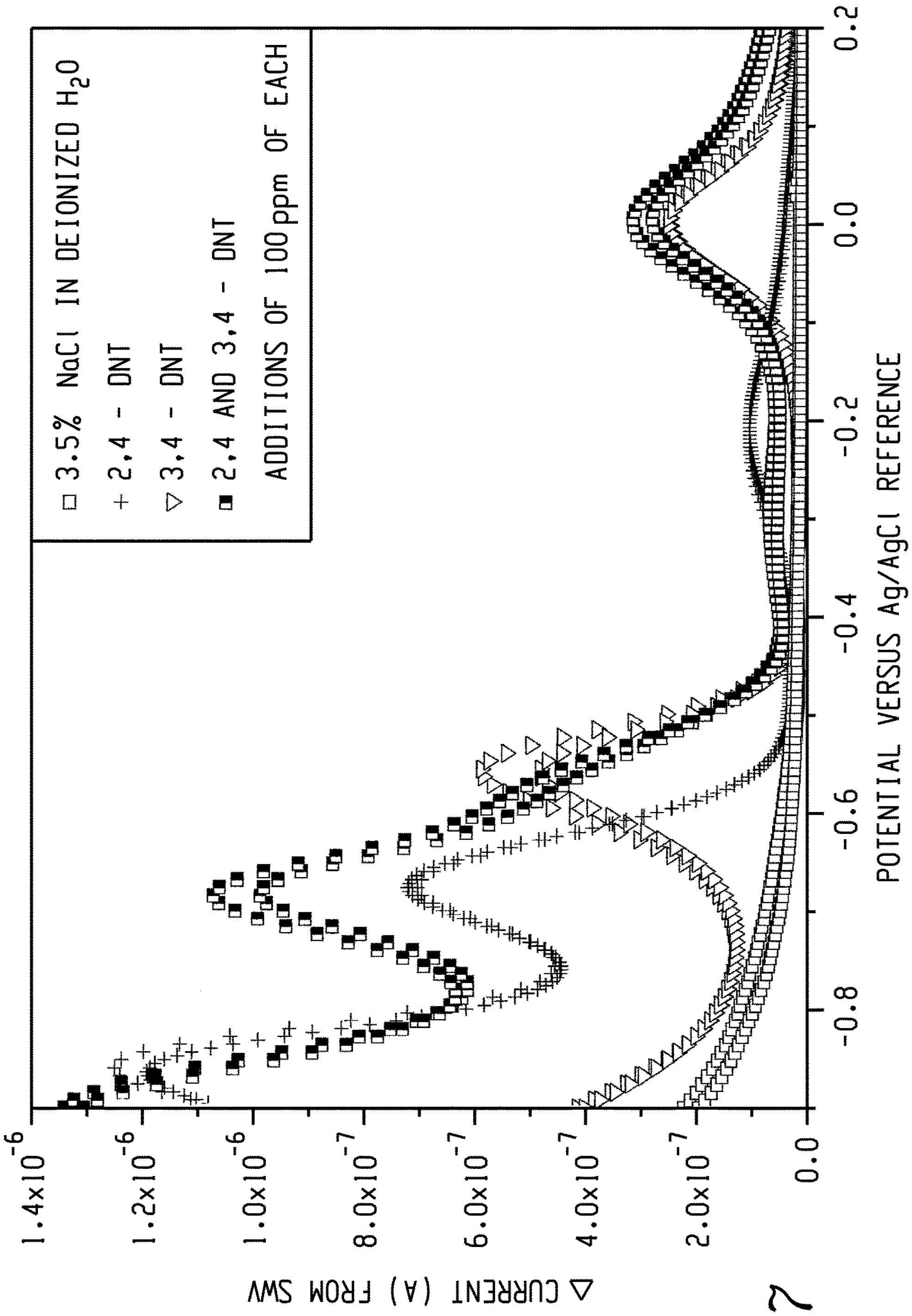
Figure 8:
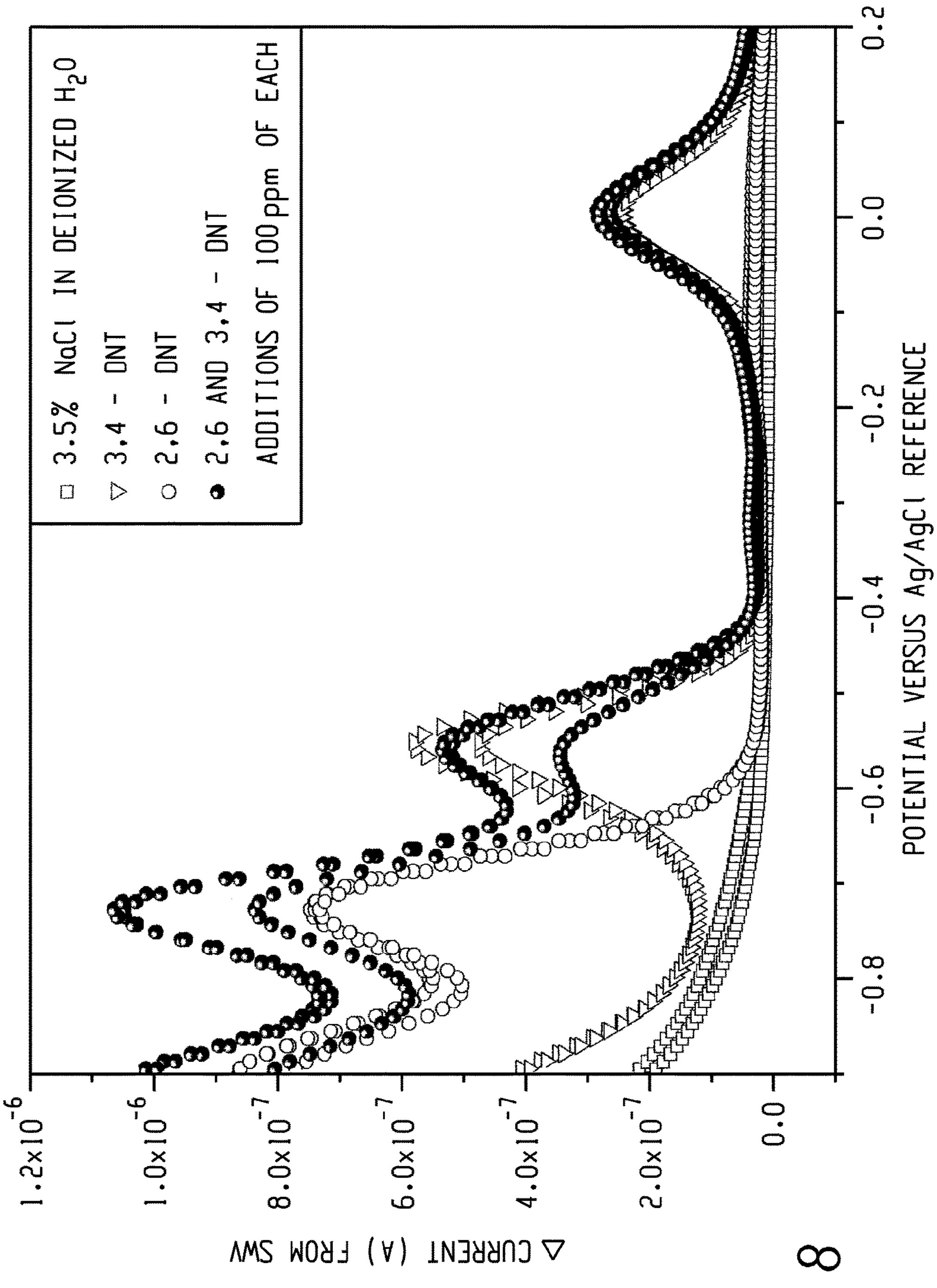
Figure 9:
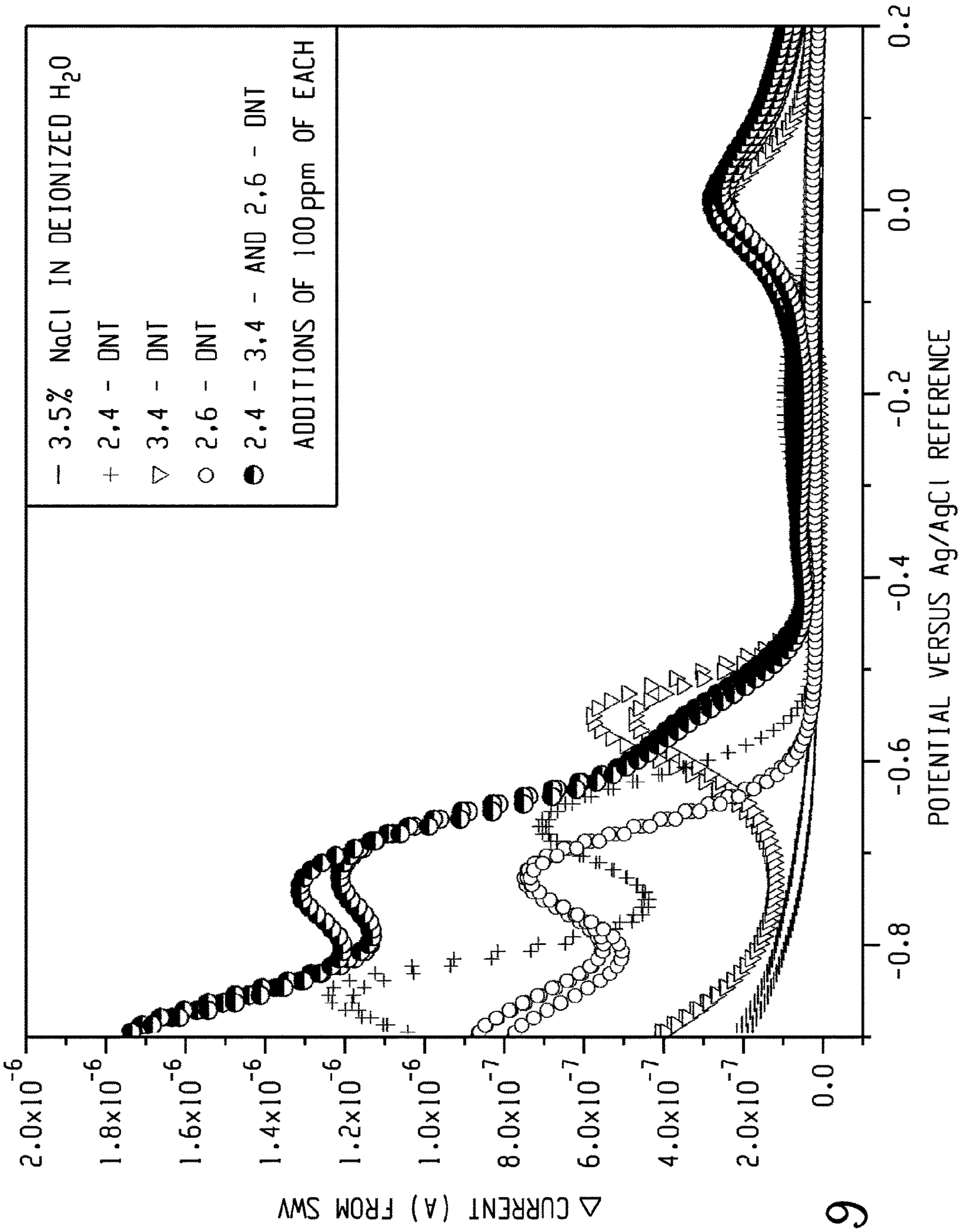

In this study, the detection of the three selected DNT species is first carried out in a 3.5% NaCl solution in deionized water (a common level of salt content in sea water). Solutions with each DNT species at a concentration of 100 ppm were prepared. Square wave voltammetry is employed in the detection using a wavelength of 5 minutes and a potential in the range of −1 to about +0.2V, relative to the reference electrode. FIG. 5 shows the sensor device response (current profile) to each of the respective DNT solutions. The results shown are an average of several cycles. The current is the difference, in amps, between the applied current and the output current.

As is apparent from FIG. 5, each individual DNT species shows a distinct current profile which is a characteristic fingerprint of the DNT species in the respective solution. It demonstrates that the sensor device 30 can be used to detect individual DNT species as shown, indicating the sensitivity of the device for such small differences in chemical structure.

FIGS. 6-9 show the testing results of the sensor device in the presence of different mixtures of the DNT species. The SWV scans of the system containing multiple components compare favorably to the individual species scans. For example, in the mixture solution containing both 2,6 and 2,4 DNTs (x in FIG. 6) two distinct current peaks are observed at the potential of approximately −0.7 and −0.9 V versus the Ag/AgCl reference electrode. A similar trend in the peak locations can be observed from the individual DNTs. While there are changes in the shape and size of the peak currents, the peak current in the mixture solution can be readily matched to those individual DNT species. Similarly, the results from the tests of other combined mixtures of DNTs can be matched by the locations of the individual DNT also, as shown FIGS. 7-9.

Example 2

Evaluation with Working Electrode Having Liquid Electrolyte Layer

The sensor device 30 coated with the ionic liquid electrolyte layer 102 (FIG. 4) was tested for the detection of the DNTs. Specifically, a liquid electrolyte layer 102 composed of 1-butyl-3-methylimidazolium hexafluorophosphate and binding components of PVB/PVDF/PVP was prepared. First, a binder mixture of polyvinylpyrrolidone (PVP), polyvinyl butyral (PVB) polyvinyldifluoride (PVDF), and 90 wt % of N-methylpyrrolidone (NMP) was prepared. A 3:10 ratio of binder to the ionic liquid is used, based on various experimental evaluations of the properties of the gelled ionic liquid prepared. For demonstration purposes, the deposition of the gelled ionic liquid film on the surface of the sensor device was performed using a pipette. The film is dried at 37° C. for one hour in room air evaporating the solvent in the binder ink. After the solvent is evaporated, the sensor devices are cooled in room temperature overnight. The curing conditions for the film can be changed without directly affecting the performance of the sensor device. Square wave voltammetry was used for detection, as in Example 1.

Figure 10:
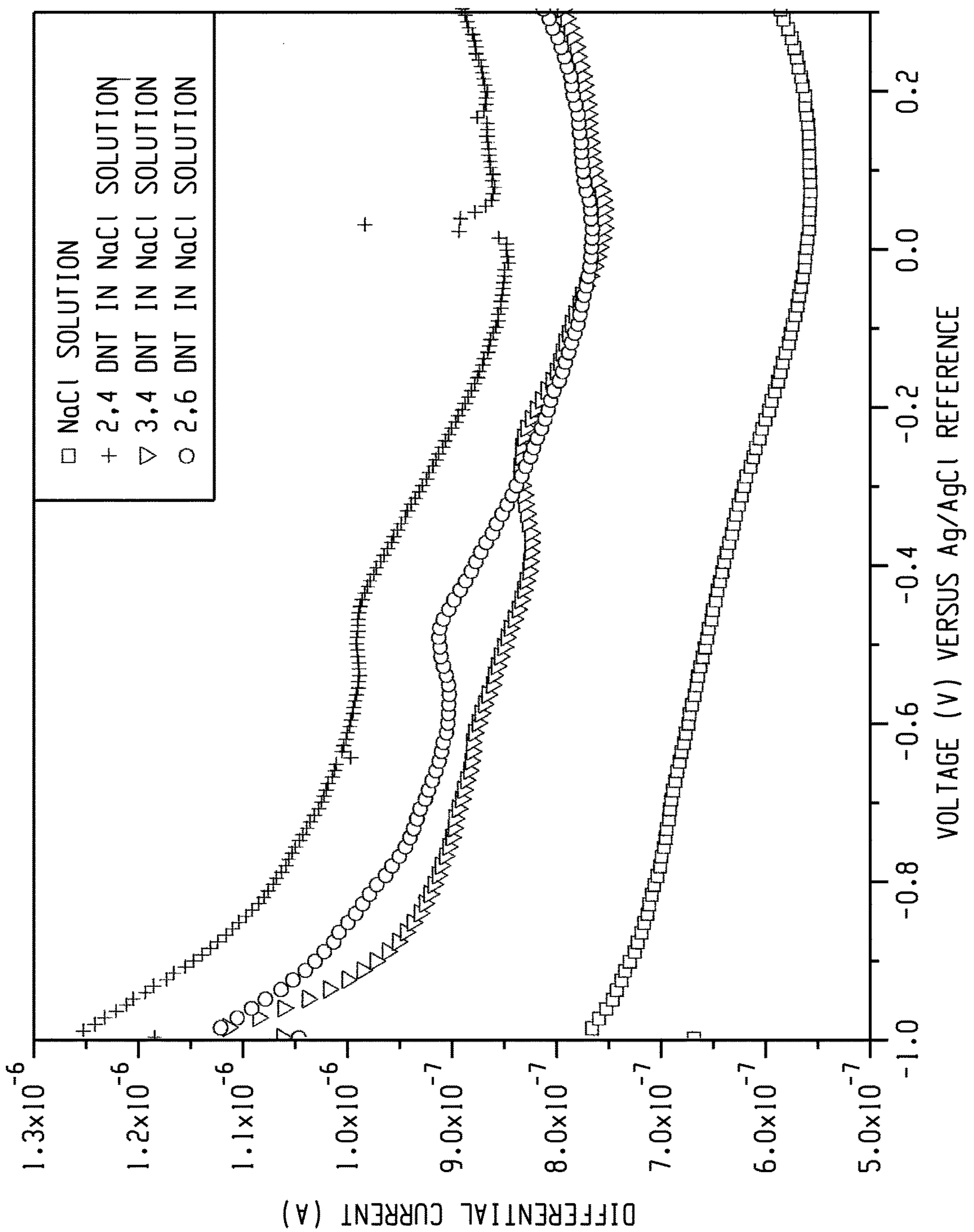
FIG. 10 illustrates sensor device performance for three individual DNTs using a gelled ionic liquid electrolyte sensor device.
Figure 11:
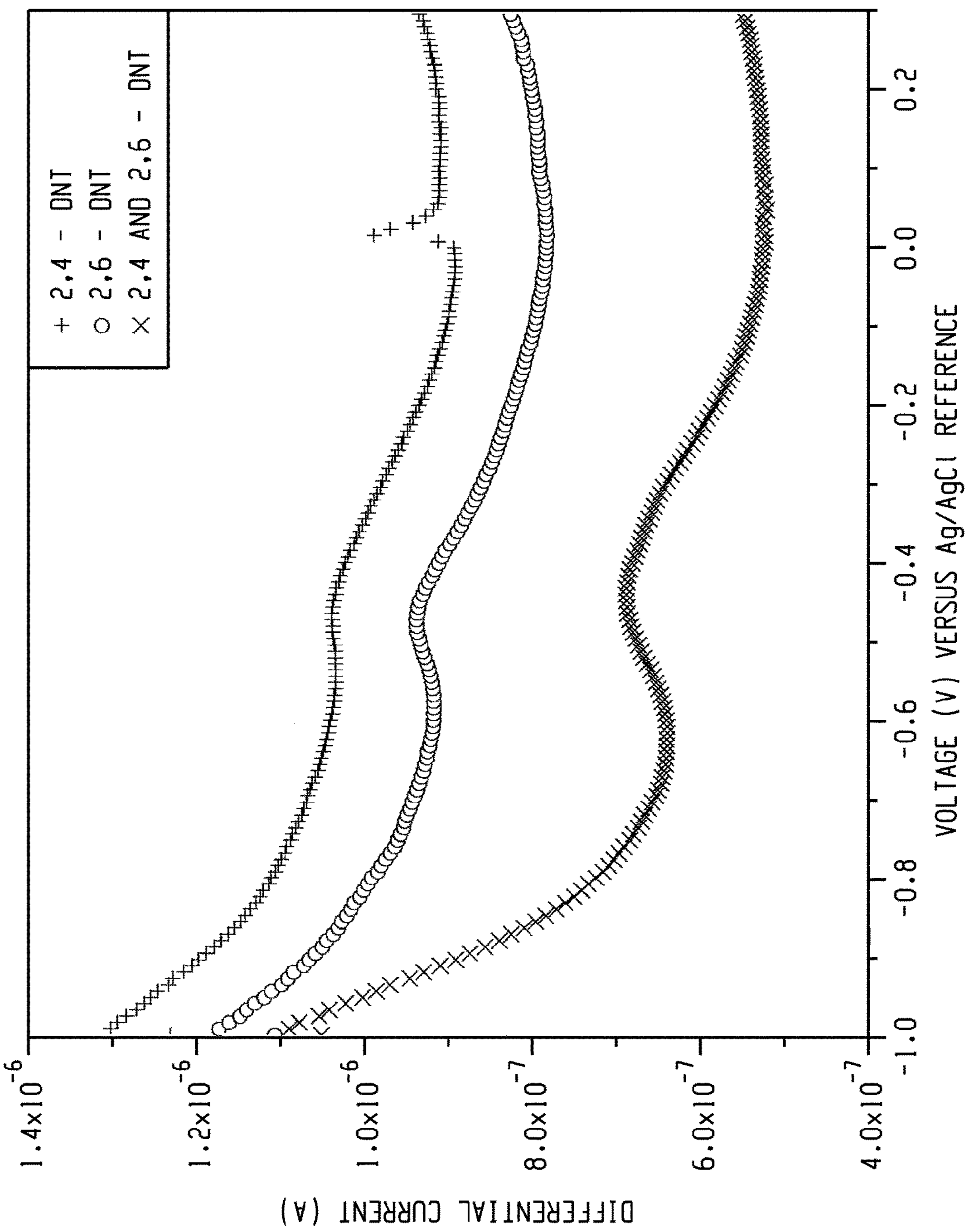
FIGS. 11-14 show performance of the gelled ionic liquid electrolyte sensor device in the mixed DNT species solutions (3.5 wt % NaCl) as compared to those for individual DNT species.
Figure 12:
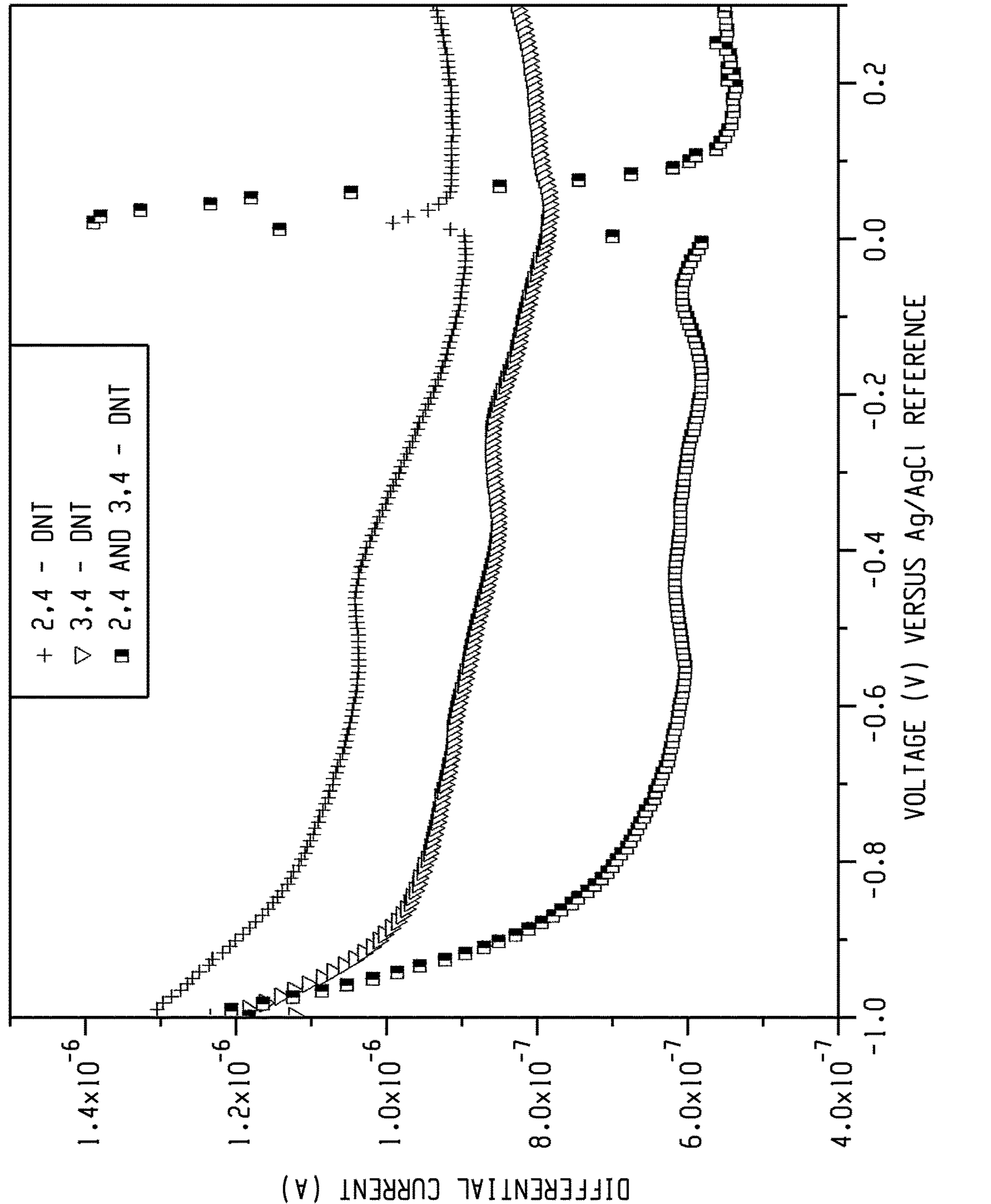
Figure 13:
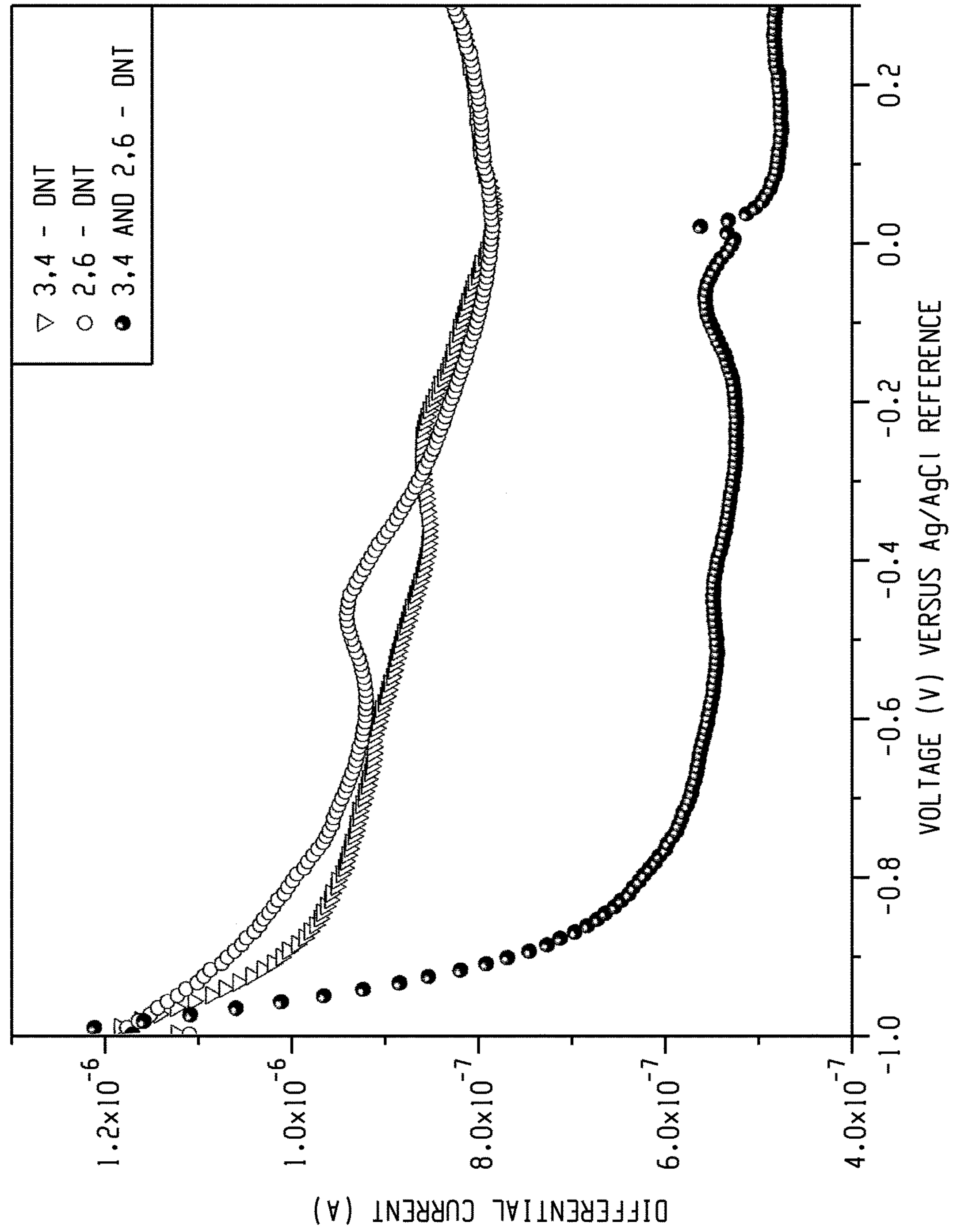
Figure 14:
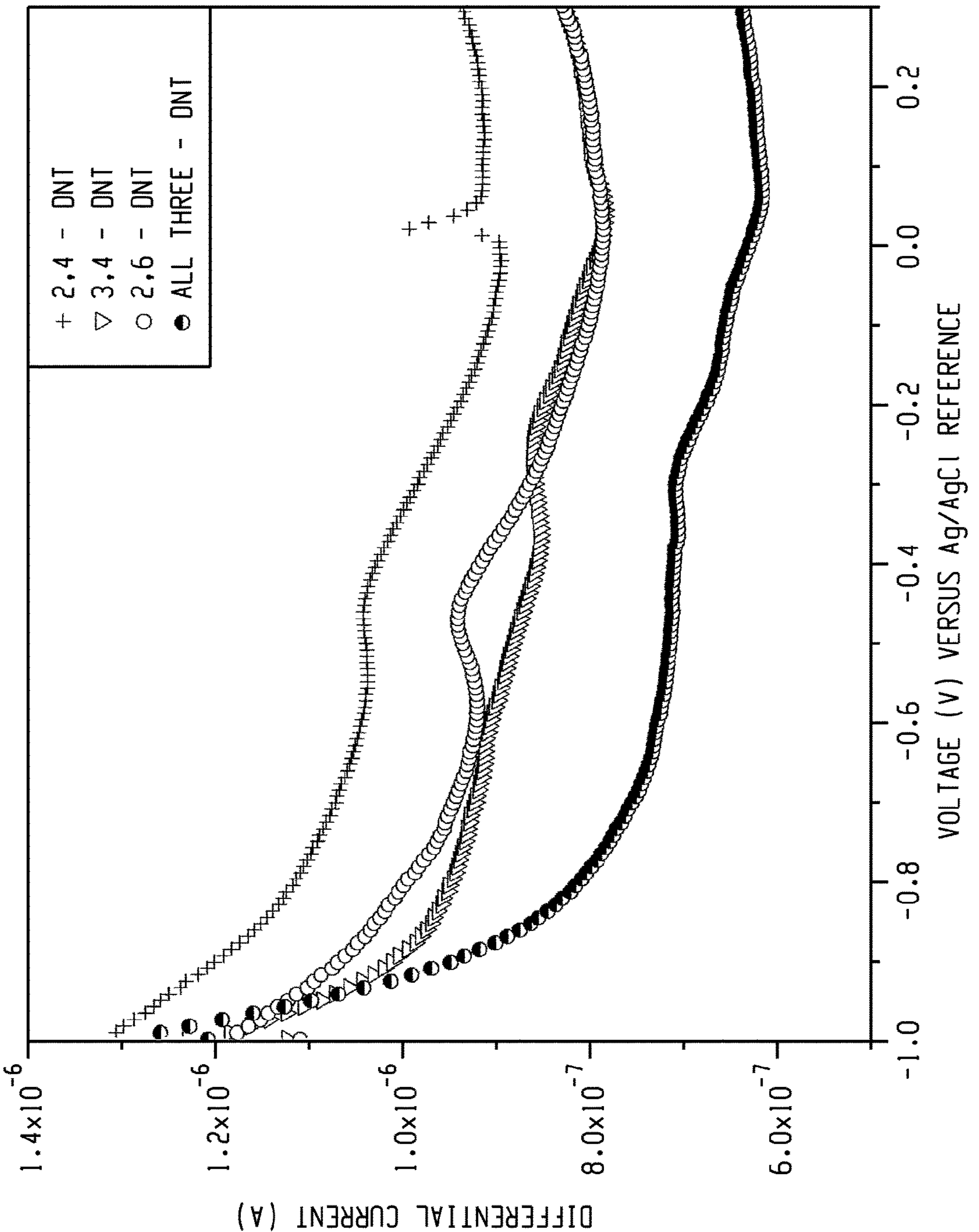

FIG. 10 shows the testing results obtained in the presence of individual DNT species using the ionic liquid coated sensor device prototype using square wave voltammetry as for Example 1. The concentration of each DNT is 100 ppm, and the DNT is dissolved in DI water as the medium for the test. FIG. 10 demonstrates the performance of the gelled ionic liquid electrolyte sensor device prototype for the detection of individual DNT species in 3.5 wt. % NaCl solution. FIG. 10, similar to the results shown in FIG. 5, shows a reasonable characteristic fingerprint for each individual DNT.

FIGS. 11-14 show a family of test results in combined mixtures of DNTs. The test results in the combined mixtures of DNTs compare well with the individual DNT's in terms of its peak current and potential locations using the ionic liquid electrolyte film as the ionic conductive layer. This observation is similar to that obtained in NaCl solution shown in FIGS. 6-9. The experimental results shown in FIGS. 6-9 and 11-14 illustrate that there is a difference in the test results using the sensor device with and without the ionic liquid layer integrated with the sensor device. However, the detection of DNTs using the ionic liquid layer sensor device is readily achieved. For the ionic liquid layer electrode, there is a shift in some of the locations of the peak currents of the mixtures as compared to the individual DNTs. This shift may be due to the preparation method and could be eliminated in an automated process.

Example 3

Evaluation of Liquid Electrolyte Layer with Gaseous DNTS

Figure 15:
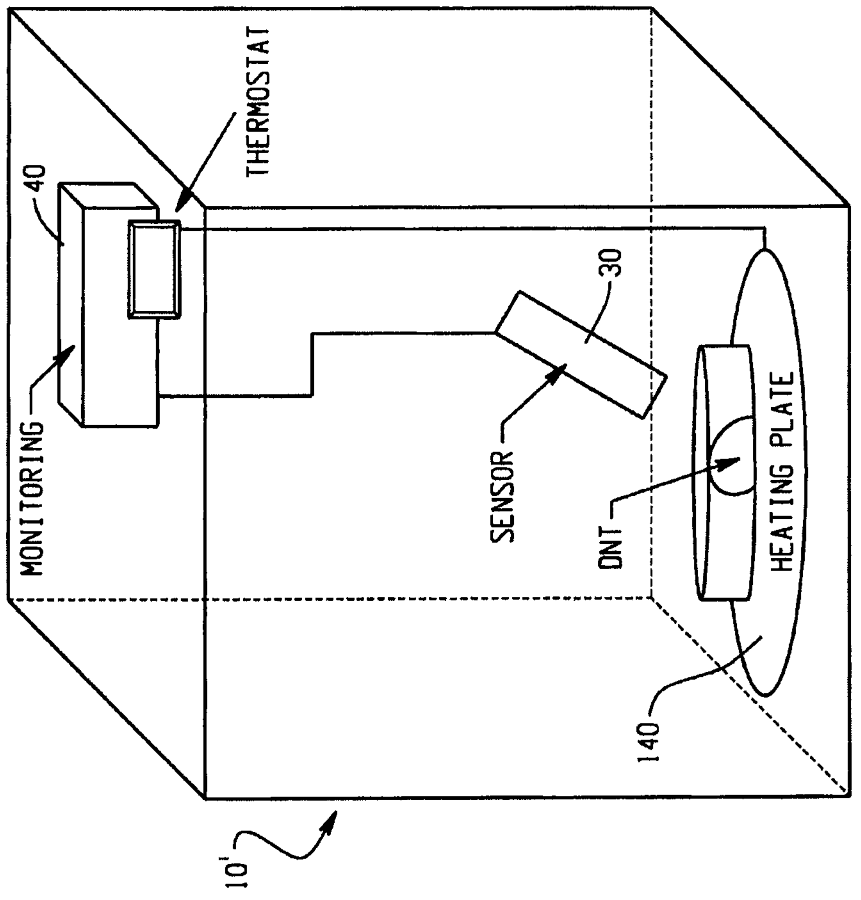
FIG. 15 illustrates a testing chamber for gas phase explosive detection.

In another evaluation, the feasibility of using the sensor device 30 with the ionic liquid electrolyte layer 102 to detect gaseous DNT species was undertaken. A simulated container 10' in the form of an enclosure or test chamber was designed and constructed, as illustrated in FIG. 15.

The temperature and the quantity of the DNT in the gas phase can be controlled using a flexible polyimide (Kapton)

coated heater 140 with a current source. A digital thermometer allows for the continuous monitoring of the temperature inside the test chamber. The test chamber is completely sealed during the testing with electrical leads integrated into the side wall of the chamber providing electrical connections for the electrode elements of the sensor device 30 and the current of the heater.

Figure 16:
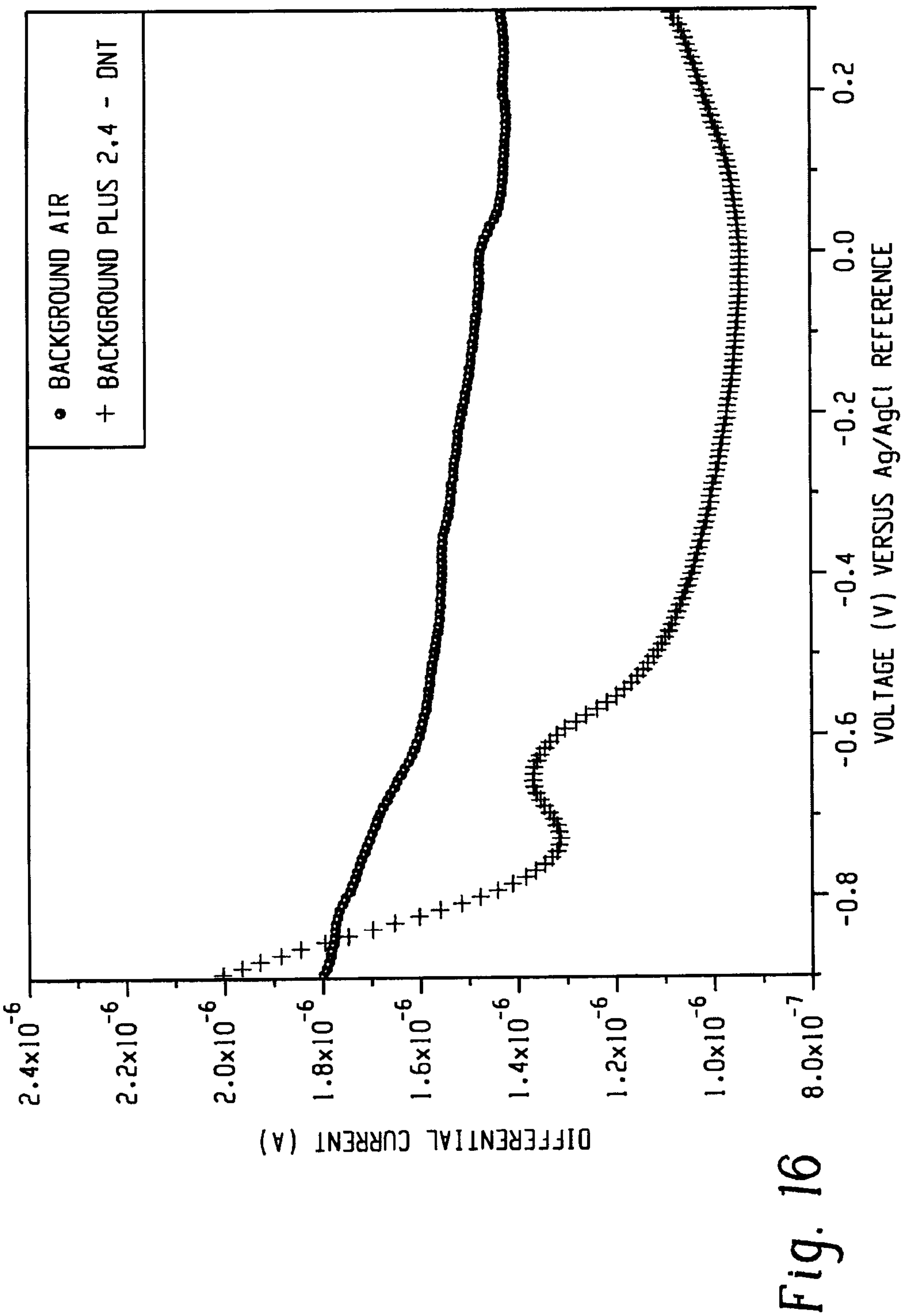
FIG. 16 is a plot illustrating the performance of the gelled ionic liquid electrolyte sensor device for gas phase DNT detection of 2-4 DNT.
Figure 17:
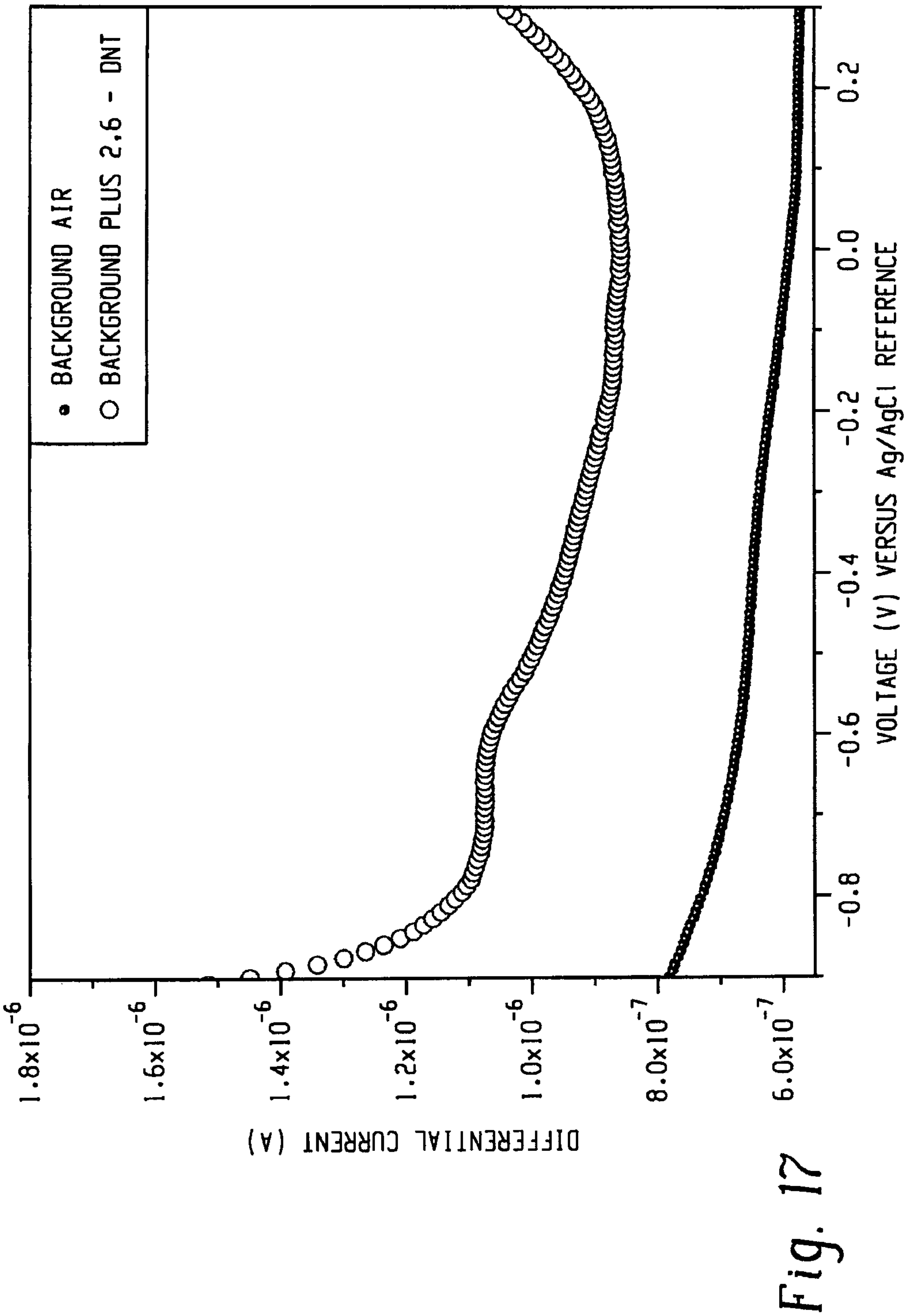
FIG. 17 is a plot illustrating the performance of the gelled ionic liquid electrolyte sensor device for gas phase DNT detection of 2-6 DNT.

The performance of the gas phase testing of DNTs is carried out using this test chamber. A sensor device 30, with a gelled ionic liquid layer 102 was prepared in the manner described for Example 2. 2,4 and 2,6 DNTs are used in this gas phase testing. Square wave voltammetry scans are used at a time interval of 5 minutes over a total time period of 20 minutes in the potential range of −0.9 V to +0.3 V vs. the Ag/AgCl reference electrode. Other experimental parameters for this test are the same as those employed in the previous Examples. FIGS. 16 and 17 show the comparison of the results in the presence and absence of the DNTs in the gas phase inside the test chamber.

There is a detectable difference between the sensor device outputs in the presence of the DNT and the background air (the absence of the DNT) in this gas phase testing. The test results demonstrate that the peak current at a specific potential of this gelled ionic liquid layer coated sensor device 30 can be used to identify the presence of the DNT in the air versus that of the background air. It can therefore be inferred that such a gelled ionic liquid covered sensor device operated in the SWV mode is thus capable of detecting DNT (and hence TNT) vapors in a closed environment, such as a cargo container 10.

In summary, these examples demonstrate that a screen-printed active carbon sensor device with a carbon working, a carbon counter and an Ag/AgCl reference electrode is capable of detecting either individual or a combination of DNT species. Due to the similar structure of DNT to TNT, the capability of the sensor device to detect nitro containing explosives can be assumed. It is found that this sensor device can detect DNTs in a 3.5 wt % NaCl solution (salinity of typical sea water) using the square wave voltammetry measuring technique.

Further, in Examples 2 and 3, the integration of an ionic liquid layer 102 serving as electrolyte composed of 1-butyl-3-methylimidazolium hexafluorophosphate and binding components of PVB/PVDF/PVP has been tested. The testing results show that this sensor device with the gelled ionic liquid electrolyte film is effective in measuring DNTs in solution.

Testing of the sensor device performance in the presence of gas phase DNTs has also been performed in Example 3. The experimental results show that the sensor device 30 has the ability to distinguish the presence of the DNT species and the absence of the DNT (air background). This detection is achieved in 20 minutes of testing time in a closed environment, such as a sealed container. The sensor device fabricated is capable of detecting DNT, or nitro containing explosives in air, at low concentration. This provides for detection of explosives in various environments. The sensor device can be manufactured cost-effectively.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A detection system for an enclosed cargo container, comprising:
- a sensor device mounted within an enclosed cargo container for sensing a material harmful to human beings within the enclosed cargo container, the sensor device comprising a working electrode with an ionic liquid layer thereon which transports the harmful material therethrough; and
- a detection device coupled to the sensor device for transmitting a corresponding signal to a monitoring device outside the cargo container.

2. The system of claim 1, wherein the harmful material comprises an explosive.

3. The system of claim 2, wherein the harmful material is selected from the group comprising nitro-based and peroxide-based explosives.

4. The system of claim 1, wherein the working electrode comprises carbon nanotubes.

5. The system of claim 4, wherein the sensor device comprises a reference electrode and a counter electrode.

6. The system of claim 1 wherein the detection device further includes at least one of:
- an encrypted serial numbered (ESN) computer chip which stores and transmits information about an encrypted serial number that is specific to the detection device; and
- a global positioning system computer chip for identifying at least one of origin and travel of the detection device and container to which the detection device is attached.

7. The system of claim 1, wherein the ionic liquid layer comprises an ionic liquid and a binder.

8. The system of claim 1, wherein the ionic liquid layer comprises an alkyl imidazolium salt.

9. The system of claim 1, wherein the sensor device is operated in an electrochemical mode selected from cyclic voltammetry, time-dependent current measurement, and square-wave voltammetry.

10. The system of claim 1, wherein detection device comprises a power source which supplies an alternating voltage to the sensor device.

11. The system of claim 10, wherein the alternating voltage is a square wave voltage.

12. The system of claim 1, wherein the detection system sends a signal when a threshold level of the harmful material is detected by the sensor.

13. The system of claim 1, wherein the detection system compares a current profile received from the sensor with that of a known harmful substance to determine if there is a match and outputs a signal based thereon.

14. The system of claim 1, wherein the detection system further includes means for detecting at least one of heat and radiation within the container.

15. The system of claim 1, wherein the sensor device and detection device are supported on a common adhesively backed strip for mounting to a wall of the cargo container.

16. In combination:
- a) a cargo container in which any suitable cargo is placed for transport from one place to another place;
- b) a detection system for detecting tampering with an enclosed container, including:
  - a sensor device for detecting materials harmful to human beings disposed in the container, the sensor device including a working electrode with a gelled ionic liquid electrolyte film, and
  - a detection device for storing and transmitting information coupled to the sensor device, the detection device transmitting a corresponding signal to a monitoring device outside the container; and c) a power source for operating the detection system.

17. The combination of claim 16, wherein the detection device is configured for transmitting a serial number specific to the detection system using an ESN computer chip.

18. The combination of claim 16, wherein the detection system sends a warning that the container has been tampered with to the monitoring device when a threshold level of the harmful substance is detected.

19. The combination of claim 16, wherein the ionic liquid layer comprises an alkyl imidazolium salt.

20. A method for detecting harmful materials comprising:

forming a sensor device comprising a working electrode, a reference electrode and a counter electrode, the working and counter electrodes each including a layer of particles of active carbon in the form of nanotubes;

positioning the sensor device in an enclosed container; and applying a voltage to the sensor device; and while the container is on board a ship, monitoring signals output by the sensor device that are indicative of a harmful substance with a monitoring device external to the container.

21. The method of claim 20, wherein the harmful material comprises an explosive.

22. The method of claim 20, further comprising:

the sensor device comprising a plurality of sensor devices and positioning one of the sensor devices in each of a plurality of the enclosed containers; and monitoring signals output by the sensor devices with the same monitoring device external to the container.

* * * * *